United States Patent
Shalunov et al.

(10) Patent No.: US 9,503,975 B2
(45) Date of Patent: Nov. 22, 2016

(54) EXCHANGING ENERGY CREDITS WIRELESSLY

(71) Applicant: Open Garden Inc., San Francisco, CA (US)

(72) Inventors: Stanislav Shalunov, Lafayette, CA (US); Gregory Hazel, San Francisco, CA (US); Micha Benoliel, San Francisco, CA (US)

(73) Assignee: OPEN GARDEN INC., San Francisco, CA (US)

(*) Notice: Subject to any disclaimer, the term of this patent is extended or adjusted under 35 U.S.C. 154(b) by 12 days.

(21) Appl. No.: 14/231,590

(22) Filed: Mar. 31, 2014

(65) Prior Publication Data

US 2015/0230172 A1    Aug. 13, 2015

Related U.S. Application Data

(60) Provisional application No. 61/937,375, filed on Feb. 7, 2014.

(51) Int. Cl.
*H04W 52/02* (2009.01)

(52) U.S. Cl.
CPC ..... *H04W 52/0212* (2013.01); *H04W 52/0296* (2013.01); *H04W 52/0261* (2013.01); *Y02B 60/50* (2013.01)

(58) Field of Classification Search
CPC ............................ Y02B 60/50; H04W 4/008
See application file for complete search history.

(56) References Cited

U.S. PATENT DOCUMENTS

| | | |
|---|---|---|
| 6,230,231 B1 | 5/2001 | DeLong et al. |
| 6,553,393 B1 | 4/2003 | Eilbott et al. |
| 7,831,692 B2 | 11/2010 | French et al. |
| 8,023,929 B2 | 9/2011 | Mgrdechian et al. |
| 8,284,782 B1 | 10/2012 | Maufer et al. |
| 8,284,783 B1 | 10/2012 | Maufer et al. |
| 8,504,062 B2 | 8/2013 | Weiss |
| 9,049,537 B2 | 6/2015 | Shalunov et al. |
| 2001/0042171 A1 | 11/2001 | Vermeulen |

(Continued)

FOREIGN PATENT DOCUMENTS

| | | |
|---|---|---|
| CN | 104838364 A | 8/2015 |
| CN | 105247504 A | 1/2016 |

(Continued)

OTHER PUBLICATIONS

Office Action for U.S. Appl. No. 13/646,617 dated Sep. 25, 2014.

(Continued)

*Primary Examiner* — Ian N Moore
*Assistant Examiner* — Lakeram Jangbahadur
(74) *Attorney, Agent, or Firm* — Nixon Peabody LLP; Joseph Bach, Esq.

(57) ABSTRACT

A system and method for effectively "exchanging" battery power among physically distinct battery-powered devices communicating in a network for optimal conservation of aggregate battery power to preserve and extend the usable life of devices before requiring recharging. The network communication may be wired, wireless, or some combination; the devices may be mobile, fixed, or some combination. This invention improves Internet access where it already exists by making it faster, more reliable, and less expensive. It can also be used to provide Internet service in places where there is none.

27 Claims, 2 Drawing Sheets

(56) References Cited

U.S. PATENT DOCUMENTS

| | | |
|---|---|---|
| 2002/0010761 A1 | 1/2002 | Carneal et al. |
| 2002/0073249 A1 | 6/2002 | French et al. |
| 2003/0131082 A1 | 7/2003 | Kachi |
| 2004/0088375 A1 | 5/2004 | Sethi et al. |
| 2005/0080884 A1 | 4/2005 | Siorpaes et al. |
| 2005/0250507 A1 | 11/2005 | Leung et al. |
| 2006/0072151 A1 | 4/2006 | Amani et al. |
| 2006/0080659 A1 | 4/2006 | Ganji |
| 2006/0098588 A1 | 5/2006 | Zhang et al. |
| 2006/0245530 A1 | 11/2006 | Pradhan et al. |
| 2006/0253735 A1* | 11/2006 | Kwak .................. G06F 1/3203 714/12 |
| 2007/0123166 A1 | 5/2007 | Sheynman et al. |
| 2007/0242637 A1 | 10/2007 | Dynarski et al. |
| 2007/0279379 A1 | 12/2007 | Stefanik et al. |
| 2008/0114773 A1 | 5/2008 | Choi et al. |
| 2008/0165701 A1* | 7/2008 | Ananthanarayanan G06Q 30/06 370/254 |
| 2008/0183305 A1 | 7/2008 | Foster et al. |
| 2008/0235239 A1 | 9/2008 | Penton et al. |
| 2009/0022095 A1 | 1/2009 | Spaur et al. |
| 2009/0089322 A1 | 4/2009 | Naaman |
| 2009/0106355 A1 | 4/2009 | Harrow et al. |
| 2009/0117949 A1 | 5/2009 | Allen, Jr. et al. |
| 2009/0182941 A1 | 7/2009 | Turk |
| 2009/0271293 A1 | 10/2009 | Parkhurst et al. |
| 2009/0275367 A1* | 11/2009 | Reinisch ................. H04W 4/20 455/572 |
| 2009/0323519 A1 | 12/2009 | Pun |
| 2010/0015919 A1 | 1/2010 | Tian |
| 2010/0088363 A1 | 4/2010 | Hughes |
| 2010/0318613 A1 | 12/2010 | Souza et al. |
| 2011/0051642 A1* | 3/2011 | Krishnaswamy ..... H04W 40/10 370/311 |
| 2011/0065424 A1 | 3/2011 | Estevez et al. |
| 2011/0066676 A1 | 3/2011 | Kleyzit et al. |
| 2012/0005746 A1 | 1/2012 | Wei et al. |
| 2012/0021760 A1 | 1/2012 | Strohbach et al. |
| 2012/0030734 A1 | 2/2012 | Wohlert |
| 2012/0110640 A1 | 5/2012 | Donelson et al. |
| 2012/0188980 A1 | 7/2012 | Wang et al. |
| 2012/0190384 A1 | 7/2012 | Marr et al. |
| 2012/0191795 A1 | 7/2012 | Heredia et al. |
| 2012/0198081 A1 | 8/2012 | Zhao et al. |
| 2012/0210000 A1 | 8/2012 | Wood |
| 2012/0311691 A1 | 12/2012 | Karlin et al. |
| 2013/0044640 A1 | 2/2013 | Yen et al. |
| 2013/0045710 A1 | 2/2013 | Raleigh |
| 2013/0058274 A1 | 3/2013 | Scherzer et al. |
| 2013/0061307 A1 | 3/2013 | Livne |
| 2013/0091288 A1 | 4/2013 | Shalunov et al. |
| 2013/0095770 A1* | 4/2013 | Moshfeghi ............ H04W 88/06 455/73 |
| 2013/0124619 A1 | 5/2013 | Steakley |
| 2013/0298181 A1 | 11/2013 | Smith et al. |
| 2014/0052497 A1 | 2/2014 | Varghese et al. |
| 2014/0087761 A1 | 3/2014 | Baskin et al. |
| 2014/0241315 A1 | 8/2014 | Niu et al. |
| 2014/0250204 A1 | 9/2014 | Shalunov et al. |
| 2014/0307600 A1* | 10/2014 | Dumitrescu ...... H04W 52/0245 370/311 |
| 2016/0255056 A1 | 9/2016 | Shalunov et al. |

FOREIGN PATENT DOCUMENTS

| | | |
|---|---|---|
| EP | 2244525 A2 | 10/2010 |
| EP | 2280514 A1 | 2/2011 |
| EP | 2904497 A1 | 8/2015 |
| JP | 2015-537419 A | 12/2015 |
| JP | 2016-517647 A | 6/2016 |
| KR | 10-2015-0068413 A | 6/2015 |
| KR | 10-2015-0139515 A | 12/2015 |
| WO | 2014/055166 A1 | 4/2014 |
| WO | 2014/137382 A1 | 9/2014 |
| WO | 2015/119669 A1 | 8/2015 |
| WO | 2015/127312 A1 | 8/2015 |
| WO | 2015/153677 A1 | 10/2015 |
| WO | 2015/153924 A1 | 10/2015 |
| WO | 2015/183583 A1 | 12/2015 |
| WO | 2016/137528 A1 | 9/2016 |

OTHER PUBLICATIONS

International Search Report and Written Opinion for PCT/US2013/056129 dated Nov. 29, 2013.
International Search Report and Written Opinion for PCT/US2013/056123 dated May 2, 2014.
Invitation to Pay Additional Fees for PCT/US2013/056123 dated Feb. 6, 2014.
Notice of Allowance for U.S. Appl. No. 13/646,617 dated Jan. 22, 2015.
Invitation to Pay Additional Fees for PCT/US2014/058917 dated Dec. 11, 2014.
International Search Report and Written Opinion for PCT/US2014/058917 dated Feb. 24, 2015.
Office Action for U.S. Appl. No. 13/944,756 dated Dec. 18, 2015.
International Preliminary Report on Patentability for PCT/US2013/056129 dated Apr. 16, 2015.
Restriction Requirement for U.S. Appl. No. 13/944,756 dated Oct. 20, 2015.
International Preliminary Report on Patentability for PCT/US2013/056123 dated Sep. 17, 2015.
International Search Report and Written Opinion for PCT/US2015/016965 dated May 27, 2015.
Invitation to Pay Additional Fees for PCT/US2015/023698 dated Jun. 25, 2015.
International Search Report and Written Opinion for PCT/US2015/023698 dated Aug. 19, 2015.
International Search Report and Written Opinion for PCT/US2015/024173 dated Jul. 13, 2015.
Invitation to Pay Additional Fees for PCT/US2015/030878 dated Jul. 23, 2015.
International Search Report and Written Opinion for PCT/US2015/030878 dated Oct. 1, 2015.
International Search Report and Written Opinion for PCT/US2015/043023 dated Nov. 2, 2015.
Extended Search Report for European Patent Application No. 13844491.4 dated May 3, 2016.
Office Action for U.S. Appl. No. 13/944,756 dated Jul. 18, 2016.
International Preliminary Report on Patentability for PCT/US2014/058917 dated Aug. 18, 2016.
International Preliminary Report on Patentability for PCT/US2015/016965 dated Sep. 1, 2016.
International Preliminary Report on Patentability for PCT/US2015/023698 dated Oct. 13, 2016.
International Preliminary Report on Patentability for PCT/US2015/024173 dated Oct. 13, 2016.

* cited by examiner

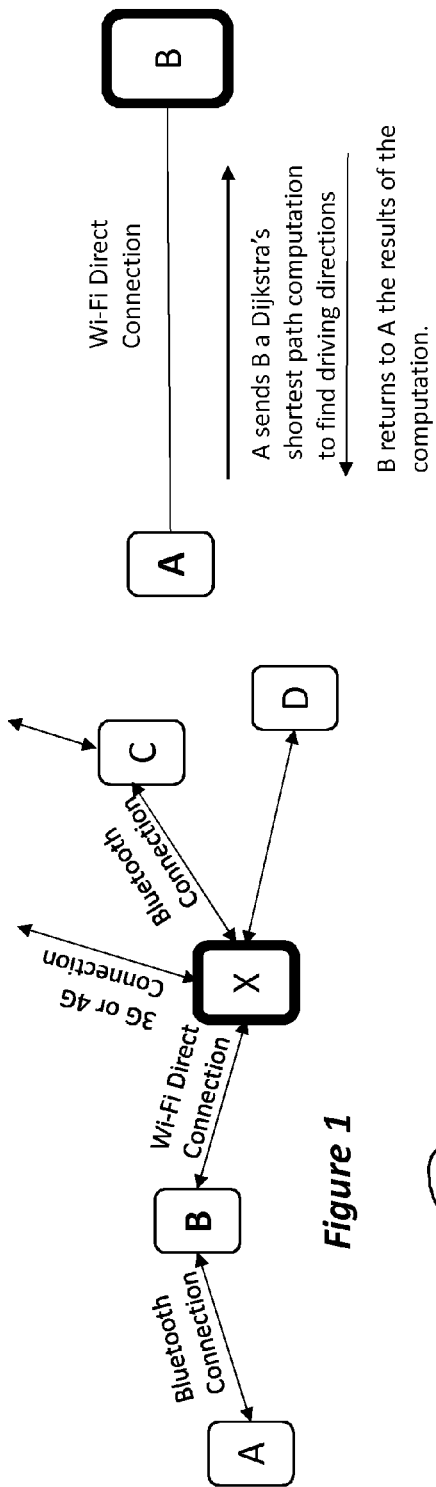
*Figure 1*
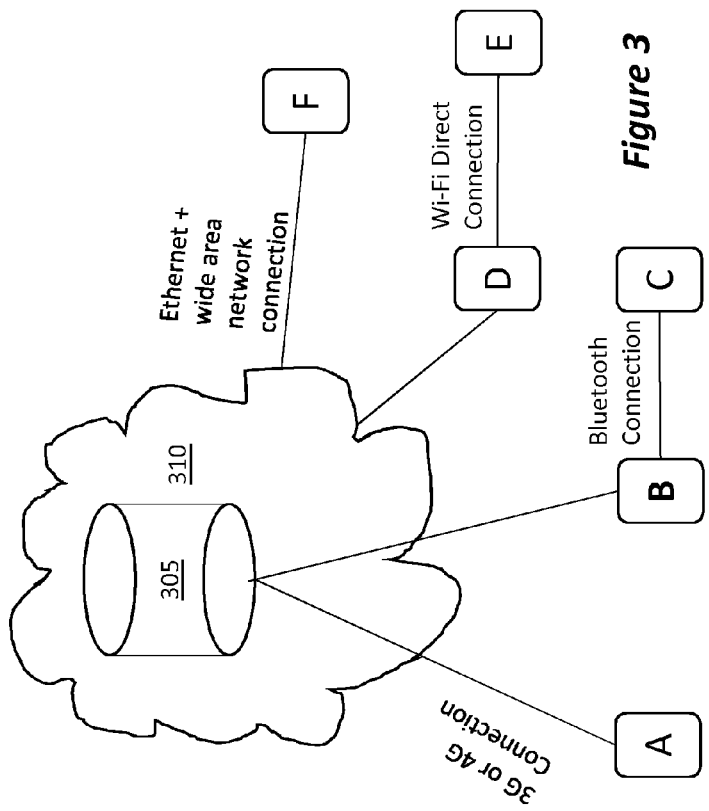
*Figure 2*
*Figure 3*

EXCHANGING ENERGY CREDITS WIRELESSLY

RELATED APPLICATIONS

This application claims priority benefit from U.S. Provisional Application Ser. No. 61/937,375, filed on Feb. 7, 2014, the disclosure of which is incorporated herein in its entirety.

BACKGROUND

1. Field

This application relates to operation of battery-powered wireless devices, such as smartphones and pads, and to managing energy consumption and wireless exchange between such devices.

2. Related Arts

The usefulness of a network depends on each device retaining sufficient battery power to remain operational, since other devices may rely upon it to reach other parts of the network. Just as a chain is only as strong as its weakest link, the usable lifetime of a network consisting of battery-powered devices may offer connectivity for only as long as the time until the device with the weakest battery runs out of power and requires recharging. However, if the power of the weakest link can be preserved or enhanced, the entire system can be improved.

Differences in power consumption of mobile devices are daily experience. For example, using a smartphone for navigation leads to accelerated depletion of the battery. This is due to the wireless communication required to obtain the data, and due to the intensive calculations required to determine the best route.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

The following outlines a method for effectively "exchanging" battery power among physically distinct battery-powered devices communicating in a network for optimal conservation of aggregate battery power to preserve and extend the usable life of devices before requiring recharging. The network communication may be wired, wireless, or some combination; the devices may be mobile, fixed, or some combination. This invention improves WAN (Wide Area Network, e.g., the Internet) access where it already exists by making it faster, more reliable, and less expensive. It can also be used to provide WAN service in places where there is none.

As an example of the former, consider a collection of wirelessly connected mobile devices. The cost of each device accessing WAN with its own cellular connection is far greater than alternative in which one of those devices, say, the one with the greatest battery power, uses a cellular connection to access WAN, and the other devices reach WAN via that one designated device using lower cost short-range Wi-Fi connections.

As an example of the latter, consider a similar scenario where only one device has WAN access, for example, suppose a region's cellular network has been disabled. A high-power device with a long-distance link somehow established (via satellite, for example), can similarly provide connectivity to other devices as in the above scenario.

Various embodiments disclosed herein enable power sharing within a network. Embodiments of this invention enables peer-to-peer networks to no longer be a "zero-sum" game because the value of a service obtained from the network when it requires it is greater than the cost of services rendered by a device to the network when it can afford to.

In environments where it may not be possible to recharge devices at will, embodiments of this invention extends the useful life of a network. This is especially true for mobile ad hoc networks. This can obviously benefit first responders at an accident site and any location that has sustained damage to the power grid. The usefulness of embodiments of the invention is hardly limited to these special cases. Its applicability is nearly universal: it can improve network functionality by extending collective battery life of network devices considered holistically, as a collective network, and provide WAN access where none exists at all in a broad range of scenarios: the mobile devices of people walking on a city street, the Internet of Things (e.g. sensor networks), devices of people in a café, smart watches—any collection of sufficiently proximate mobile devices seek WAN connectivity can collectively benefit from this invention. Broadly speaking, the invention applies to any collection of mobile devices close enough to each other to form ad hoc wireless connections whose battery capacities and charges are non-uniform and whose WAN connections vary in capacity and signal strength, e.g. 3G, 4G, Wi-Fi and Bluetooth.

It is in the self-interest of each device's user to participate in the network induced by this invention, since it enables each device to effectively "borrow" battery power when its battery charge is low, in exchange for offering to "lend" battery charge when the device's charge is high. This effectively benefits all participants by increasing the efficiency of the system taken as a whole, i.e., viewed holistically. This cannot be achieved if each device's behavior is governed by a locally greedy algorithm ("myopically selfish"), i.e., hoarding (never lending) battery power.

Other aspects and features of the invention would be apparent from the detailed description, which is made with reference to the following drawings. It should be appreciated that the detailed description and the drawings provides various non-limiting examples of various embodiments of the invention, which is defined by the appended claims.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1 is a diagram illustrating devices lending power for network connection, according to one embodiment.

FIG. 2 is a diagram with devices lending power for a computation, according to one embodiment.

FIG. 3 is a diagram of a system for collection of power consumption data, according to one embodiment.

DETAILED DESCRIPTION

Figure 4:
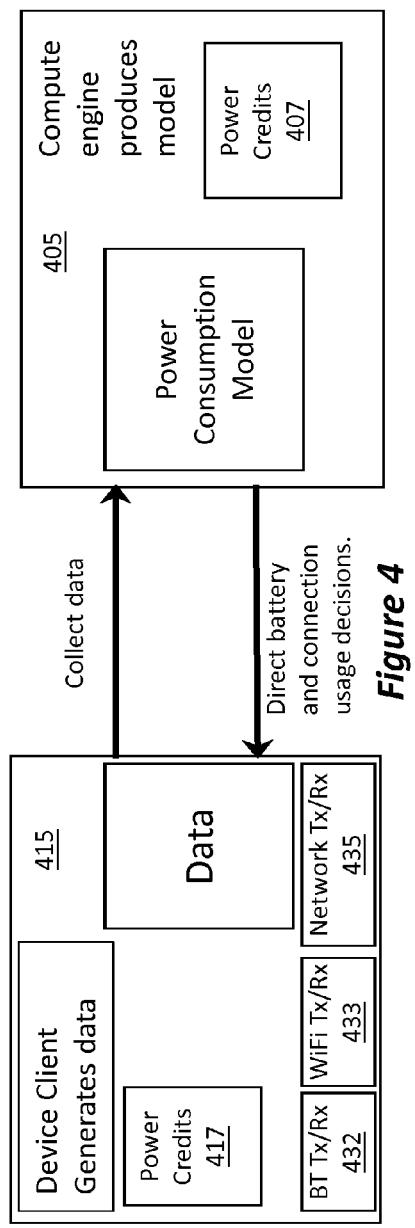
FIG. 4 is a diagram for a fitting a model of power consumption, according to one embodiment.

Embodiments of the invention will now be described, highlighting certain aspects and advantages. The various embodiments enable sharing battery power of network-connected devices. These embodiments are based on the fact that different types of connections require different levels of power and different classes of devices have widely varying battery capacities. Examples where these embodiments may be employed include the following scenarios:

People carrying diverse devices such as smart phones and laptops, wearable devices such as Google Glass or Samsung Gear and Pebble in an urban environment such as a park, a café or shop, a public square, or at a concert or sports event. Users may be doing any of the WAN-based activities these devices permit: e-mail, text messaging, accessing online content such as news, music, and video. This will benefit those devices with smaller batteries and weaker connections the most.

Internet of Things, in which WAN-connected devices in homes, offices, or factories communicate with each other. Benefits include: transparent connectivity, i.e., there is no need to configure each device with network information. Semi-mobile sensor networks, sometimes connected to power grid, sometimes not. Example: Rhumba (household vacuum appliance).

WAN-enabled cars—cars have huge batteries and alternators, effectively providing infinite energy on tap. Enabling battery saving on devices inside a car, and also among other cars nearby.

First responders—dependent on battery-powered devices and communication through these devices The following are factors affecting the energy requirements of wireless connections:

Longer-Range Connections Require More Energy:
a Bluetooth connection costs approximately 50 milliwatts (1 watt=1 joule/second)
a Wi-Fi connection costs approximately 300 milliwatts
a 3G cellular connection costs approximately 1.5 watts
In September 2007, NTT DoCoMo demonstrated e-UTRA data rates of 200 Mbit/s with power consumption below 100 mW during the test.

Connections with Greater Bit-Rates Require More Energy:
This is a consequence of the Shannon-Hartley theorem, which states that the capacity of a connection is equal to the bandwidth times the log of the signal to noise ratio, i.e. capacity=bandwidth*log(1+signal/noise).
This is known as the bandwidth or spectrum efficiency, and states that over a connection operating at a given frequency range, faster bit-rates require greater energy, and will therefore drain a device's battery more quickly.

Different Transmission Technologies have Different Energy Consumption Characteristics
GSM
CDMA Devices in Different Classes have Batteries with Widely Differing Capacities:
smartphone batteries have a capacity of 1,500 to 2,100 mAh (mAh=milliamp hour)
tablet battery capacities are in the range 6,000-11,000 mAh
a typical laptop capacity is in the 4400-5800 mAh range
some ultra-high power laptops have batteries in the range of 33,600-54,000 mAh These differences create different cost structures. Different devices incur different transmission costs. There are two main metrics for measuring transmission costs: cost-per-second and cost-per-byte. Cost-per-byte of data transmitted is the most obvious, but cost-per-second of elapsed transmission time is an important factor as well, since often network interfaces remain operational for several seconds after a transmission. Sometimes the relative cost of two network connections differs depending on the metric. For example, a 4G connection has a higher cost-per-second than a 3G connection, but a lower cost-per-byte. These differences in transmission cost are two-fold: the use of different transmission technologies (e.g. CDMA, GSM) and the variability of signal strength (which is dependent on several factors, including the distance of a device to a cellular tower, the weather, the presence of various objects or materials through which the signal must travel: human bodies, walls, foliage, and other factors that cause interference. The presence or absence of these various factors may result in two nearby identical mobile devices experiencing signal strength differentials of ten decibels or more.

Obtaining Information from the Operating System

It is possible to determine the dBm (decibel-milliwatts, a measure of power) of a connection from a device's operating system, which obtains it from the radio interface layer (RIL). Essentially, the dBm of a connection of a device is how strong the connection is, i.e. how clearly and loudly the device detects the tower's signal. The greater the distance from the tower, the weaker the signal strength. A weaker signal affords a lower bit rate (for a given level of power) or requires more power (for a given bit rate).

It is also possible to obtain the following metrics from the operating system:
1. the battery capacity of the device
2. the fraction of battery power currently available on the device
3. the battery temperature (most devices have thermometers on their CPUs and batteries; batteries work best when they're operating within a certain temperature range.)

Various embodiments take advantage of the situation described above to enable "sharing" of battery power. Specifically, when a diversity of network connections exist within a network, it is possible to route traffic over cheaper paths. Similarly, when a diversity of battery capacities exists among devices within a network, the embodiments enable offloading computation from weaker devices to stronger ones. At each point in time during the operation of a network, the embodiments enable a device with greater battery power to assume responsibility for expensive operations, both communication and computation.

FIG. 1 illustrates a diagram with devices lending power for network connection (e.g. getting to 3G or 4G through Bluetooth). In FIG. 1, Device X has a high-bandwidth WAN connection, such as 3G, 4G, Broadband, etc. On the other hand, devices A, B, and D have no direct WAN connection. Devices A, B, and D gain WAN access through their connections, direct and indirect, to X. In this example Device C also connects to WAN via X, even though it has its own connection. This is because, in this particular example, its connection is more expensive for it to use than its Bluetooth connection, while X can spare the processing power, battery power, and bandwidth required to serve Device C. Thus, when Device C requires high data rate, e.g., for downloading a video, it may send the request via its own connection, since a request is a rather short transmission, but receive the downloaded response via device X. Similarly, if decoding of the video is required, such decoding may be done by Device X prior to sending the data to Device C over its Bluetooth connection.

Network tasks include communication and computation. Computation is also expensive (in terms of battery consumption), and can sometimes be offloaded. Computations include the use of codecs to render graphics, display video, and generate audio. Trade-offs exist between transmission costs and computation costs. For example, by sending uncompressed data, such as bitmaps, compression and decompression computations are avoided at the cost of transmitting more data. Also, it may be cheaper for the network as a whole if devices with low battery power offload computations to other devices with high battery power. For example, a device with low battery power may send data to a node with more available battery power, and have that device perform a computation (such as Dijkstra's shortest path computation to find driving directions in a map application) and return the result. This represents a savings if the cost of transmitting and receiving the data is less than the cost of the computation, since CPU-intensive computations are a major cause of battery drain. This scenario could arise in a network having one device with a 90% charged battery and a smartphone with only a 10% charged battery, for example.

FIG. 2 is a diagram with devices lending power for a computation. In the example of FIG. 2, Device B has a more powerful battery than Device A, or Device A's battery is much more drained than the battery of Device B. Therefore, Device A sends request for computations to B. For example, device A may send Device B a request for Dijkstra's shortest path computation to find driving directions from point X to point Y. Device B then performs the calculations and returns the results to device A.

It's advantageous for the system to make network operations happen on the device with greater power, and to make communication transmit on the least costly connections. Rather than having each network device make decisions about its power consumption in isolation, specific embodiments take a holistic view of the network in its entirety with the goal of preserving battery power in devices that are running low in power, in addition to reducing average per-device battery power consumption. Since devices may have different levels of battery charge, the algorithm used by these embodiments offload tasks:

from devices with less battery capacity to devices with greater battery capacity (e.g. from a phone to a tablet, or from a tablet to a laptop computer)

from devices with less fully charged batteries to devices with more fully charged batteries thereby extending for as possible the battery life of network devices. These goals could seemingly conflict: consider the situation where network contains a laptop that is 61% charged and a phone that is 64% charged. In this case, the laptop has much more actual power. The embodiment can use the following heuristic to determine which of two devices should perform a given network task, if either device could in principle perform it:

If the devices have different battery capacities, the device with the greater battery capacity should perform the task.

If two devices have comparable battery capacity, the device with greater remaining charge should perform it.

In one embodiment, the system or method consists of three components:

a. the trading mechanism that performs the actual exchange, b. an accounting mechanism that keeps track of how many credits each device has at any time, c. an estimation mechanism that is based on "big data"—empirical observations of actual costs of different operations, rather than "nominal" costs (fixed, pre-computed estimates stored in a table).

Additional Benefits

1. If two paths to a wide area network access point exist, this embodiment makes available the arithmetic sum of the bandwidth of those network connections.

2. This embodiment also makes it possible to gather connection strength and battery usage data for a wide range of devices under a wide range of conditions due to network effects of widespread usage: effectively harnessing a huge population to gather data. This enables more accurate estimation of per-byte and per-second transmission costs and power utilization to a much greater degree than would otherwise be possible.

The system or method according to the invention makes system-wide decisions about the allocation of battery power and battery utilization, rather than simply letting each device make local decisions about saving its own battery. Reducing system-wide battery consumption reduces average per-device consumption.

If a 3G connection is offloaded to a Wi-Fi connection through a Bluetooth connection, a power savings will likely result, since Wi-Fi connections are far cheaper, faster, and more reliable than 3G connections in terms of energy per byte, as well as cheaper in terms of dollars per byte.

Distributing battery usage in a network as described above extends the time until network devices deplete their battery charge.

FIG. 3 is a diagram of a system for collection of power consumption data, according to one embodiment. In FIG. 3 a compute engine 305 is implemented in the "cloud" 310. Devices A, B, D and F have direct connection to WAN, while device C and E do not have direct connection, but rather communicate with the compute engine 305 via a linked connection from Devices B and D, respectively. The various Devices send information about their battery power and connection strengths to the compute engine 305 via cellular and/or wired connections. This compute engine 310 then may inform the devices whether they should "borrow" or "lend" battery power and connection usage. Alternatively, the devices may use a distributed algorithm to make decisions locally.

It should be appreciated that having a direct connection to WAN does not necessarily mean that the directly-connected device would perform taxing calculations. For example, in FIG. 3 Device C may not have direct WAN connection since Device C is a pad having no cellular transmitted, while Device B, being a cellphone, has very good WAN service using 4G LTE. However, since Device C is a Pad it may have a fast processor and ample battery power, while device B may be running low on battery due to repeated cellular transmissions. Thus, it may be beneficial to offload all taxing processing from Device B onto Device C, using the Bluetooth connection between them to exchange data.

According to another aspect, embodiments of the invention use a credit accounting system:

When one device offers another device some battery power, it obtains "joule credits."

When a device uses another device's battery power, it pays for it with credits.

For that purpose, the embodiments may use the following information:

level of battery power
how many bytes transferred
battery power the device consumes In one embodiment, the system would use nominal costs, i.e., consulting a table of fixed, pre-computed, published estimates. On the other hand, other embodiments described herein use actual costs, based on empirical, observed data obtained from the operating system of the connected participating devices. Gathering actual battery usage and connection strength data by direct measurement enables these embodiments to calculate connection costs more accurately than it could by using nominal costs.

Basic Operation

According to one embodiment, each device periodically sends to a cloud-based computation engine one or more of the following data:

battery capacity
fraction of battery power available
battery temperature
each available connection's type
each available connection's signal strength
each available connection's bit rate (nominal and/or actual)
the durations that each connection remains active (i.e., until the radio becomes quiescent) after a transmission terminates (this additional connection time requires additional power)
the currently running applications The cloud-based computation engine stores the information in a database and uses it to compute the per-second cost and per-byte cost of those connections. Based on this data, a model of battery costs, and the above-mentioned heuristics, the cloud-based computation uses an allocation algorithm to make decisions about which devices should off-load computations to which other devices and which network connections should be used if multiple options exist. The cloud-based compute engine executes algorithms that use the above inputs to model the energy consumption behavior to optimally fit this data to the most appropriate decisions about the allocation of battery power and connection bandwidth to achieve the properties described above. These algorithms use linear programming and Gaussian least squares techniques, and take into account the trade-off between the execution time and power consumption of the cloud computation and the quality of the fit, i.e., how well the connection and battery utilization decisions fit the data obtained by the compute engine.

FIG. 4 is a diagram for a fitting a model of power consumption, according to one embodiment. The process depicts a successive refinement wherein the cloud-based compute engine 405, running on a computing platform, such as a server, collects data from network-connected user devices 415. Compute engine 405 then uses this data to generate a power consumption model and uses this model to direct the actions of the devices 415 to either "borrow" or "lend" power and connection bandwidth. The compute engine 405 also uses this newly generated data to refine its power consumption model. This iteration proceeds continuously to refine the model and provide accurate instructions to the devices preferably in real time, based on the particular condition of the devices in each particular instance of time and based on the particular usage of these devices at that particular instance.

FIG. 4 also illustrates a feature wherein power credits/debits are maintained for each participating device. For example, the compute engine 405 may maintain a table of credits 407, wherein for each device an entry is maintained for its power sharing status. As the device provides "power equivalents" the device receives power credits, which are recorded in the table 407. These credits may also be recorded in the device itself, in table 417. Conversely, as the device uses power equivalents from other devices, its power account is debited by the appropriate power equivalent units. The power equivalent units may correlate to ampere-hour or other representative measure of power usage.

Accordingly, FIG. 4 also illustrates a system and a method for accounting and lending battery power by using energy credits. The system includes a main credit bank, wherein the power credit and debits of each user device is recorded and tracked. When a particular user device connects to the network via another device, a corresponding power debit is recorded in the main credit bank for that particular device, and a power credit is recorded in the main credit bank for the another device. Similarly, when one particular device sends a computation request to another device, a corresponding power debit is recorded in the main credit bank for that particular device, and a power credit is recorded in the main credit bank for the another device. The system and a method also estimate the amount of battery power operations of a device consume or will consume by fitting a power consumption model to data collected from the user devices. The system and method may estimate the amount of battery power operations of a device consume or will consume by fitting a power consumption model to data collected on devices by the least-squares method.

As illustrated in FIG. 4, the user device 415 generally has several transceivers, which generally operate at different frequencies and protocols. For example, in FIG. 4 three transceivers are illustrated: Bluetooth transceiver 432, WiFi transceiver 433 and WAN network transceiver 435. Other transceivers, such as NFC, IrLED, etc., may also be provided. Also, in the context of this specification, network transceiver refers to the one or collection of transceivers that enable the device to communicate directly with a cellular network, such as 3G, 4G, LTE, using any protocols, such as GSM, TDMA, etc.

Additional benefits may be provided, as follows. Embodiments of this invention improve a device's ability to avoid being exploited by malicious actors or asymmetries. A malicious actor may attempt to exploit the same device to provide paths to wide area networks. This stems from the credit accounting component. If someone wants to consume, their credits will drop to zero. At that point, the device must either contribute battery charge to the network by providing services to low-battery charge devices, or pay for more additional power credits. Failing to do so will disable the device from obtaining any more network services.

Clients

Various embodiments of the invention may be implemented by running clients on user devices. For example, a client software can execute a method enabling the device to participate in energy exchange transactions with other devices connected to the network. In this respect, the network is considered as all methods of communications among devices, including cellular network, WiFi, Bluetooth, NFC, IrLED, etc. The device may be running one or more applications, which can send service request to the operating system (e.g., iOS, Android, et.). When an application sends a service request, for example, a transmission request or a processing request, the client may intercept the request and perform battery level check. When the battery charge level is above a threshold, the client allows the device to perform the service request. On the other hand, if the battery charge level is below the threshold, the client may alter the service request or instruct the operating system to perform a modified request. For example, if it is a transmission request, the client may first determine whether the transmission request is for a transmission over a high power transceiver, such as a network transceiver. If so, the client may instruct the device to send a message to a second device that is connected to it via low power transceiver, such as WiFi or Bluetooth. The message includes a request to perform the transmission over a high power transceiver of the second device. The message may also include a request to receive and relay any third-party response to the transmission. In one embodiment, when the device sends a message with service request, the device may receive a message indicating reduction of energy credits available to the device, while the second device, if performing the requested service, may receive a message for increase of energy credits available to the second device.

Also, in one embodiment, when the second device receives a service request, it may first check its battery charge level. If the level is above a threshold, the second device may perform the requested service. However, if the battery level is below a threshold, the second device may refuse the requested service and may send a reply to that effect.

Figure 5:
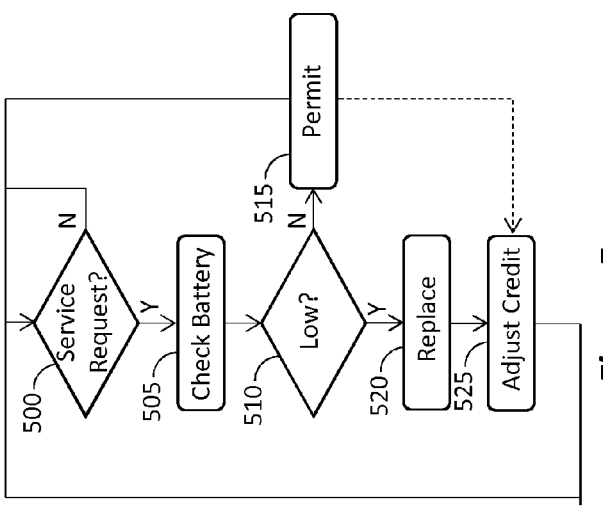
FIG. 5 is a flow chart of a method according to an embodiment of the invention.

FIG. 5 is a flow chart that is made sufficiently generic to cover various operations of the described embodiments. For example, the flow chart of FIG. 5 can be applied to a device needing to perform calculations. In step 500 the client detects a service request from an application running on the device. In step 505 the client checks the battery charge level. If the charge level is deemed adequate, e.g., above a threshold, then the client permits the operation at step 515. For example, the client may intercept the service request prior to the request reaching the operating system (OS) and, if the battery level is adequate deliver the request to the OS. On the other hand, if the battery charge level is deemed inadequate, e.g., below a threshold, at 520 the client would disallow and modify or replace the request. For example, the client may cause the device to transmit a message to another device, the message containing a request to perform the calculations the reply with the result. Then, at 525 the client may adjust the energy credits available for the device. For example, the client may decrease the available credit by a set amount. Alternatively, the client may reduce the energy credits available according to a message received by the device. The message may originate from a management server. Alternatively, the message may be included in the reply from the second device.

The flow chart of FIG. 5 can also be used to track the actions of the receiving and servicing device. For example, at step 500 the device receives a service request from a second device. Then, at step 505 the client checks the battery charge level. If the charge level is deemed adequate, e.g., above a threshold, then at step 515 the client permits the device to service the request. For example, the client may intercept the service request prior to the request reaching the Application and, if the battery level is adequate deliver the request to the Application. When the request is delivered, the appropriate application would perform the requested calculation and then provide the result so that it can be send to the requesting device. On the other hand, if the battery charge level is deemed inadequate, e.g., below a threshold, at 520 the client would disallow the service request. For example, the client may cause the device to transmit a message to the second device, informing the second device that the service cannot be provided. Then, at 525 the client may adjust the energy credits available for the device. For example, if the device provided the service, the client may increase the available credit by a set amount. Alternatively, the client may increase the energy credits available according to a message received by the device. The message may originate from a management server. Alternatively, the message may be included in the service request from the second device.

The flowchart of FIG. 5 is also applicable to transmissions. For example, in step 500 the client detects a service request from an application running on the device. The service request is for data transmission over a relatively high power consuming transceiver, e.g., a transceiver for communication with the cellular network. In step 505 the client checks the battery charge level. If the charge level is deemed adequate, e.g., above a threshold, then the client permits the operation at step 515. In this respect, the threshold may be different depending on the particular situation. For example, a different threshold can be used for calculation request and for transmission request. Back to step 505, if the battery charge level is deemed inadequate, e.g., below a threshold, at 520 the client may cause the device to transmit a message to another device over a transceiver that requires less power, e.g., a WiFi, a Bluetooth, etc. The message would contain a request to perform the transmission to the requested destination. Then, at 525 the client may adjust the energy credits available for the device. For example, the client may decrease the available credit by a set amount. Alternatively, the client may reduce the energy credits available according to a message received by the device. The message may originate from a management server. Alternatively, the message may be included in the reply from the second device.

When a device receives a request for transmission service, it may also follow the flow chart of FIG. 5. For example, at step 500 the device receives a service request from a second device, requesting to transmit data to indicated destination. Then, at step 505 the client checks the battery charge level. If the charge level is deemed adequate, e.g., above a threshold, then at step 515 the client permits the device to service the request and send the data to the requested destination. The transmission may be performed over any available transceiver. For example, if the device can deliver transmission to the requested destination over WiFi, it would use that for the transmission. Similarly, if the device can deliver the transmission over the cellular network and there is sufficient battery charge, the device may execute the transmission.

On the other hand, if the battery charge level is deemed inadequate, e.g., below a threshold, at 520 the client would disallow the service request. For example, the client may cause the device to transmit a message to the second device, informing the second device that the service cannot be provided. Then, at 525 the client may adjust the energy credits available for the device. For example, if the device provided the service, the client may increase the available credit by a set amount. Alternatively, the client may increase the energy credits available according to a message received by the device. The message may originate from a management server. Alternatively, the message may be included in the service request from the second device.

As described above, the entire system may be implemented as software, which may operate partly as a main compute module residing in the cloud, e.g., on a server, and partly as distributed clients in various network-connected devices. As such, the main compute module may be programmed to run on any server-based operating system, such as Windows, Linux, etc., while the client may run on any user device operating system, such as iOS, Android, etc. The system may run on a generic computing platform, such as that described with respect to FIG. 6.

Figure 6:
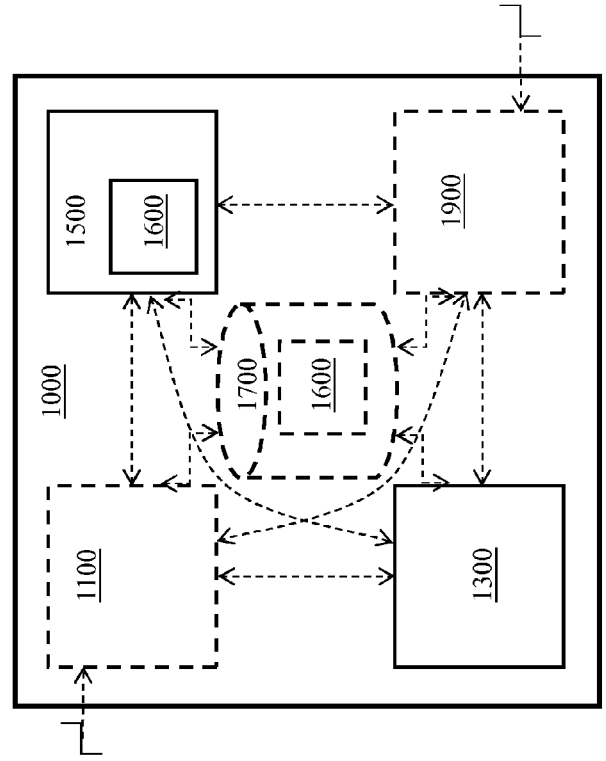
FIG. 6 is a schematic of a computing device that may be used in conjunction with embodiments of the invention.

FIG. 6 depicts a device or a computer system 1000 comprising one or more processors 1300 and a memory 1500 storing one or more programs 1600 for execution by the one or more processors 1300.

In some embodiments, the device or computer system 1000 can further comprise a non-transitory computer-readable storage medium 1700 storing the one or more programs 1600 for execution by the one or more processors 1300 of the device or computer system 1000.

In some embodiments, the device or computer system 1000 can further comprise one or more input devices 1100, which can be configured to send or receive information to or from any one from the group consisting of: an external device (not shown), the one or more processors 1300, the memory 1500, the non-transitory computer-readable storage medium 1700, and one or more output devices 1900.

In some embodiments, the device or computer system 1000 can further comprise one or more output devices 1900, which can be configured to send or receive information to or from any one from the group consisting of: an external device (not shown), the one or more processors 1300, the memory 1500, and the non-transitory computer-readable storage medium 1700.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory may store a subset of the modules and data structures identified above. Furthermore, memory may store additional modules and data structures not described above.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies disclosed in this specification are capable of being stored on an article of manufacture to facilitate transporting and transferring such methodologies to computing devices. The term article of manufacture, as used herein, is intended to encompass a computer program accessible from any computer-readable device or storage media.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

While this invention has been discussed in terms of exemplary embodiments of specific materials, and specific steps, it should be understood by those skilled in the art that variations of these specific examples may be made and/or used and that such structures and methods will follow from the understanding imparted by the practices described and illustrated as well as the discussions of operations as to facilitate modifications that may be made without departing from the scope of the invention defined by the appended claims.

The invention claimed is:

1. A system for performing power management of network connected devices, comprising:
   a server embedded with a compute engine implemented on a network cloud and forming a network connected computing platform;
   a network-connected user device embedded with a client; wherein:
   the compute engine is programmed to receive battery data of the network-connected user device and calculate preferred communication and processing path and transmit the preferred communication and processing path to the network-connected user device, wherein the compute engine calculate preferred communication and processing path according to a heuristic: when two network-connected use devices have different battery capacity, the communication and processing path is assigned to a network-connected user device with higher battery capacity, when two network-connected user devices have similar battery capacity, the communication and processing path is assigned to a network-connected user device with higher battery charge; and
   the client is programmed to cause the network-connected user device to receive the preferred communication and processing path from the compute engine and perform wireless communication according to the preferred communication path and perform computations according to the preferred processing path;
   wherein the compute engine comprises:
     a trading module performing exchange of joule credits;
     an accounting module maintaining joule credits of each user device to form a main credit bank;
     an estimation module that calculate joule credit charge by fitting a power consumption model to empirical observation of actual data of different operations of network-connected user devices; and,
   wherein the client periodically transmits to the compute engine at least: battery capacity, fraction of battery power available, battery temperature, available connections types, available connections signal strength, available connections bit rate, and currently running applications.

2. The system of claim 1, wherein the preferred communication path comprises one of direct connection to an Internet gateway or re-route connection via a secondary user device that is connected to an Internet gateway.

3. The system of claim 2, wherein the secondary user device is indirectly connected to the Internet Gateway.

4. The system of claim 1, wherein the user device is further programmed to maintain power credit entries corresponding to the battery data of the user device.

5. The system of claim 1, wherein the user device is programmed to perform computations according to the preferred processing path by connecting to a secondary user device and sending a request to the secondary user device to perform requested computation and to send a reply to the user device with outcome of the computation.

6. The system of claim 5, wherein the network-connected user device is programmed to perform computations according to the preferred processing path by further turning off network transceiver of the network-connected user device and communicate only over a Bluetooth or WiFi connection.

7. The system of claim 1, wherein the user device is programmed to send a request to a secondary user device over a Bluetooth connection.

8. The system of claim 1, wherein the user device is programmed to send a request to a secondary user device over a WiFi connection.

9. The system of claim 1, wherein the client is further programmed to obtain battery charge status and, when battery charge status is low, cause the network-connected user device to turn off network transceiver of the network-connected user device and communicate only over a Bluetooth or WiFi connection.

10. The system of claim 1, configured for controlling battery utilization of a plurality of user devices, each of the devices having a network transceiver and at least one secondary transceiver, and further comprising:
monitoring battery status of the user devices;
when a battery of one device of the user devices is indicated to be low, performing at least one of:
directing all wireless communications though the secondary transceiver; or
avoiding performing complex computation by sending to another device of the plurality of user devices a request to perform the complex computation and to transmit a reply containing the outcome of the complex computation.

11. The system of claim 10, wherein when the battery of the one device of the user devices is indicated to be low, further comprising: turning off the network transceiver.

12. The system of claim 10, wherein the step of sending to another device comprises sending a transmission over the secondary transceiver.

13. The system of claim 10, wherein the secondary transceiver comprises one of a Bluetooth transceiver and WiFi transceiver.

14. The system of claim 10, further comprising maintaining a log of power credits allocated to the plurality of user devices.

15. The system of claim 10, further comprising monitoring signal strength of the network transceiver of each of the plurality of user devices.

16. The system of claim 15, further comprising using the battery status and the signal strength to allocate network connection optimally among the plurality of user devices so as to maximize battery life of the plurality of user devices as a whole.

17. The system of claim 16, wherein the step of allocating network connection optimally comprises determining for each of the plurality of user devices whether to communicate using the network transceiver or the secondary transceiver.

18. The system of claim 16, wherein the step of allocating network connection optimally comprises causing user devices having low battery charge to communicate with the network through other user devices having high charge.

19. The system of claim 10, further comprising, estimating power consumption of computing operation required by the one device and, if the estimated power consumption is high with respect to the battery status of the one device, requesting another user device to perform the operation and to send the result to the one device.

20. The system of claim 1, wherein for a device participating in energy exchange transactions for reducing power consumption by a plurality of devices, performing the steps comprising:
receiving by the device a message from a second device, the message including a processing request;
performing the processing request by the device, to thereby obtain a processing request result;
transmitting from the device a message to the second device, the message including the processing request result;
receiving in the device an indication of increasing a level of energy credits available to the device.

21. The system of claim 20, further comprising forwarding the processing request message result to a requesting application in the second device.

22. The system of claim 20, further comprising after receiving the processing request, but prior to performing the processing request, checking battery level in the device and, if the battery level is below a threshold, rejecting the request by sending a rejection message to the second device.

23. The system of claim 1, wherein for a device participating in energy exchange transactions for reducing power consumption by a plurality of devices, performing the steps comprising:
generating a message and sending the message to a second device, the message including a processing request;
receiving in the device an indication of decreasing a level of energy credits available to the device;
receiving a message from the second device, the message including a processing request result.

24. The system of claim 23, further comprising prior to sending the processing request checking battery level in the device and sending the processing request only if the battery level is below a threshold.

25. The system of claim 1, wherein for device participating in energy exchange transactions for reducing power consumption by a plurality of devices, comprising:
receiving by the device a message from a second device, the message including a transmission request;
performing the transmission request by sending a message to a third device;
transmitting an acknowledgement message to the second device, indicating performance of the transmission request;
receiving in the device an indication of increasing a level of energy credits available to the device.

26. A system of claim 1, wherein for a device participating in energy exchange transactions for reducing power consumption by a plurality of devices, performing the steps comprising:
receiving a transmission request from an application running on the device;
checking battery level in the device and:
when the battery level above a threshold, executing the transmission request, but when the battery level is below the threshold sending a message to a second device, the message requesting the second device to perform the transmission request.

27. The system of claim 26, further comprising, after sending the message to the second device, receiving in the device an indication of reducing a level of energy credits available to the device.

\* \* \* \* \*